Figure 6:
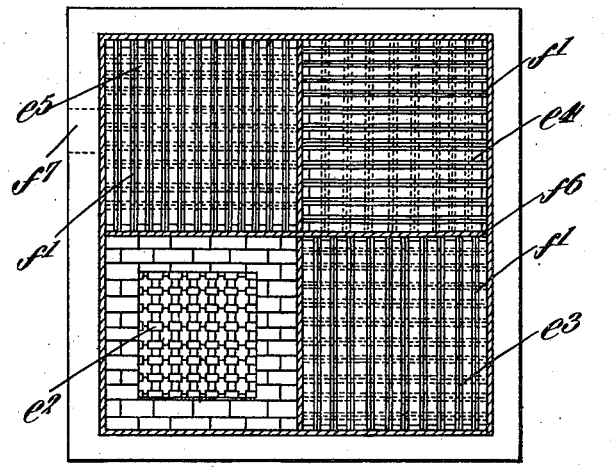
Figure 6:
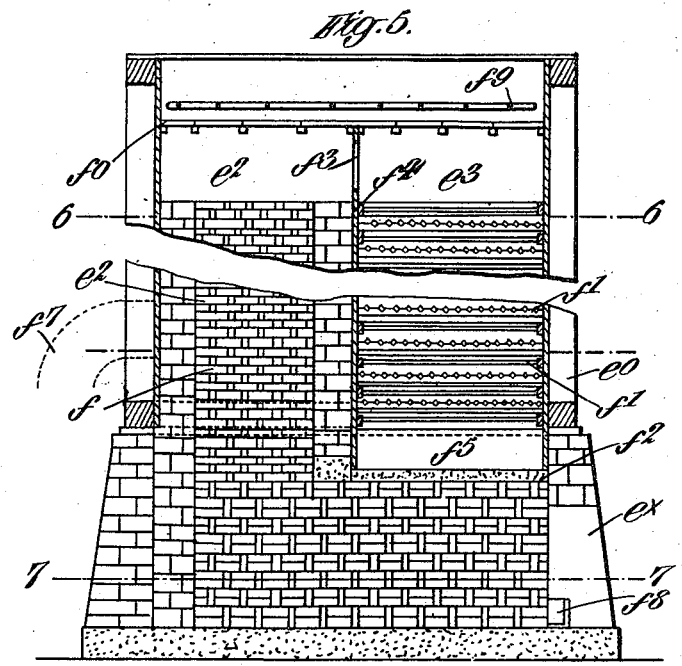

O. C. RUDOLPH.
TREATMENT OF ORES.
APPLICATION FILED DEC. 16, 1914.
1,171,255.
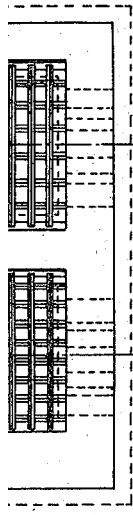
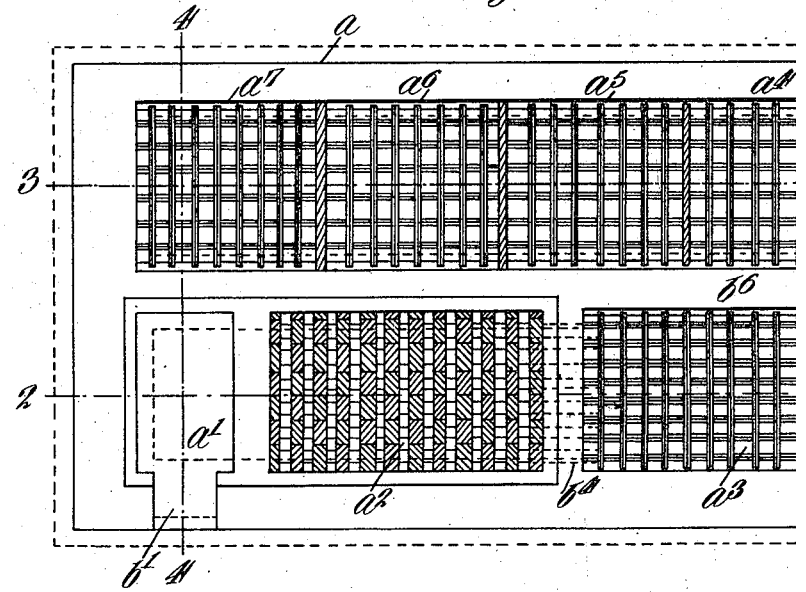
Fig. 1.
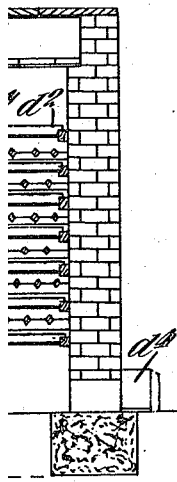
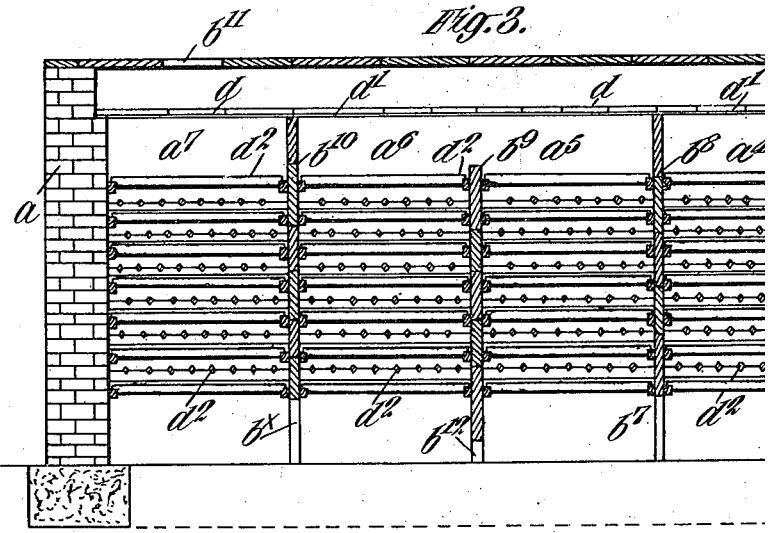
Fig. 3.

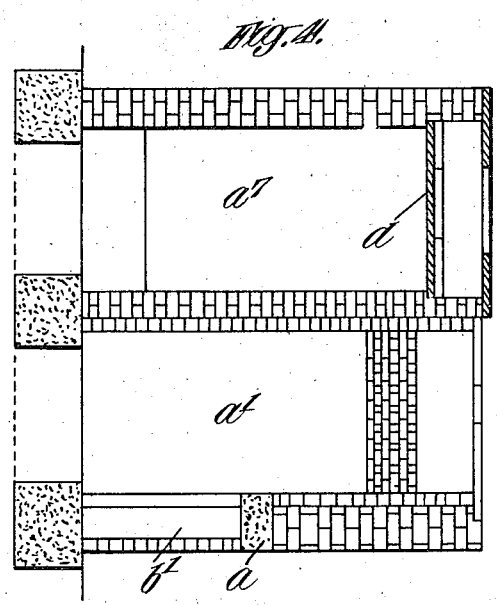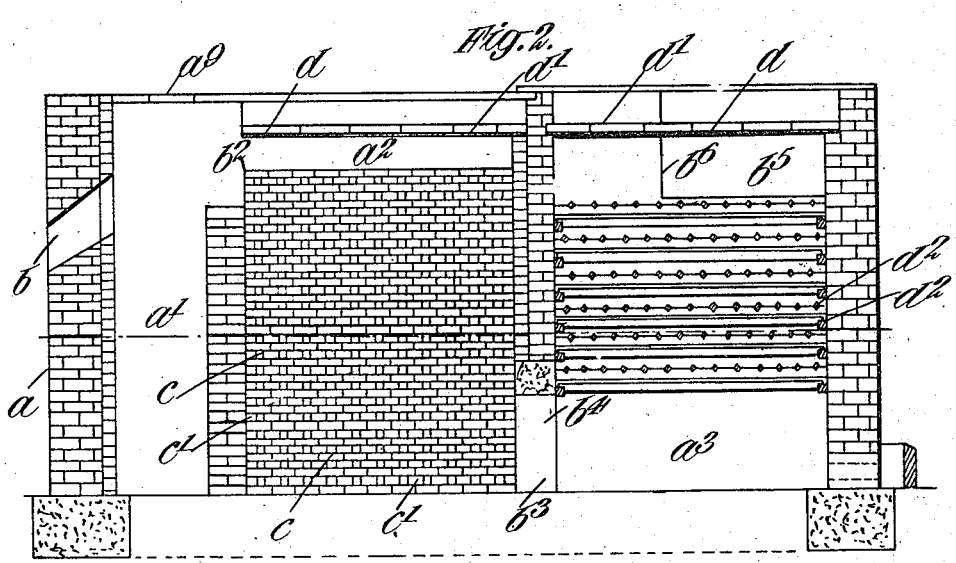

O. C. RUDOLPH.
TREATMENT OF ORES.
APPLICATION FILED DEC. 16, 1914.
1,171,255.
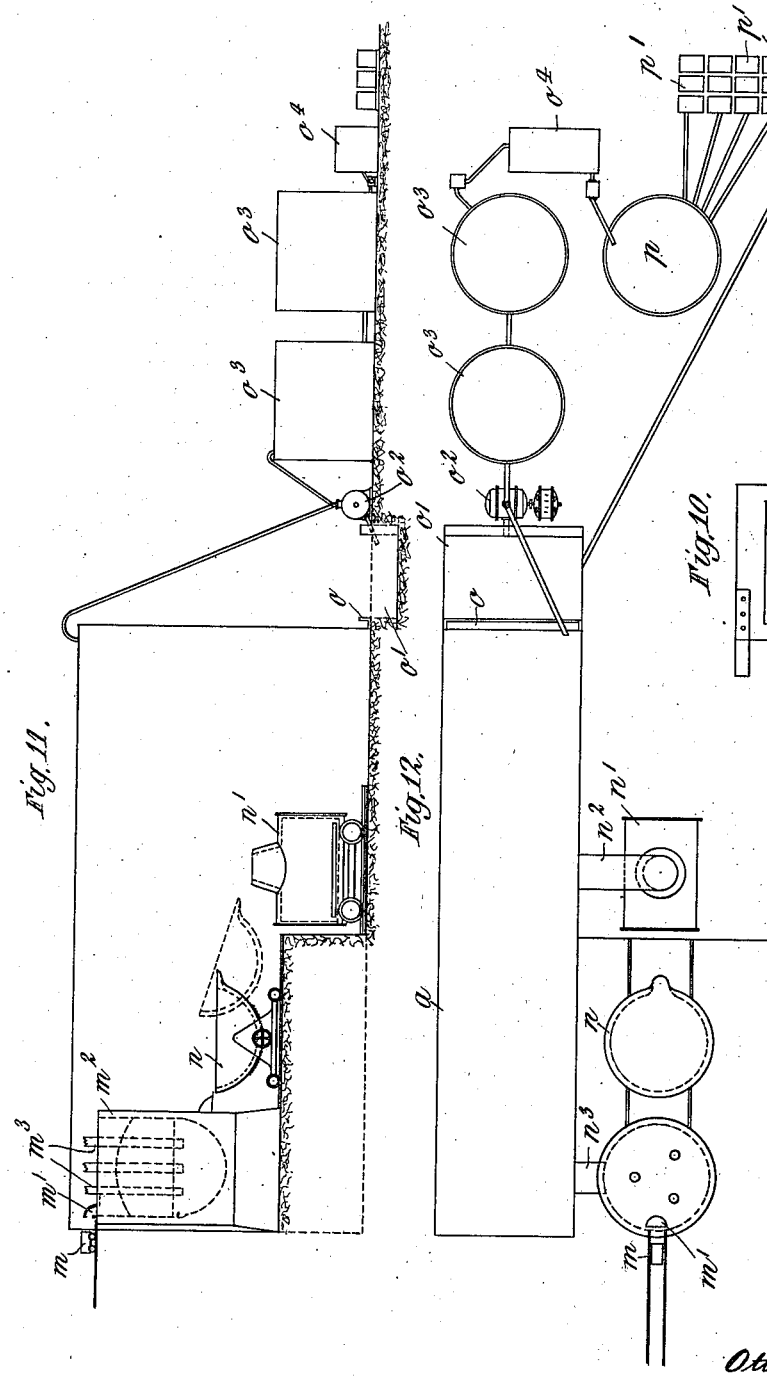

UNITED STATES PATENT OFFICE.

OTTO CARL RUDOLPH, OF ALDWYCH, LONDON, ENGLAND, ASSIGNOR TO OTTO STALMANN, OF SALT LAKE CITY, UTAH.

TREATMENT OF ORES.

1,171,255.  Specification of Letters Patent.   Patented Feb. 8, 1916.

Application filed December 16, 1914. Serial No. 877,553.

*To all whom it may concern:*

Be it known that I, OTTO CARL RUDOLPH, a citizen of the United States of America, and temporarily residing at the Waldorf Hotel, Aldwych, in the county of London, England, have invented certain new and useful Improvements in or Relating to the Treatment of Ores, of which the following is a specification.

This invention relates to a process for treating ores by volatilization and subsequent condensation of their volatile metallic constituents.

My improved process is particularly adapted to treating complex ores which as a rule contain minerals such as copper, lead, zinc, iron and variable amounts of silver in the form of sulfids, and also gold in intimate combination, the chief object being to overcome the difficulty and prohibitive expense incidental to the treatment of such ores by known processes.

According to this invention the ores in the raw state are fused with or without fluxes as required to form a matte containing the bulk of the volatile constituents as well as the permanent metals of the ores, the matte being of such a character that when it is subjected to an air blast in a suitable converter, the whole of the volatile constituents such as zinc, lead and sulfur and part of the silver are volatilized and recovered in a suitable wet condensing chamber or tower. During the fusing of the ores, which takes place in an electric furnace a part of the zinc, lead and silver and such sulfur therein as is not required for the formation of the matte will volatilize while the copper, iron and the like and the bulk of the zinc, lead and silver will combine with the sulfur in the ores to form with the gold the matte at the bottom of the furnace.

The volatilization of the whole of the zinc in the ores in the electric furnace would take considerable time and would entail the consumption of a large quantity of electric current and in order to overcome this defect the furnace is merely utilized to fuse the charge and render the same in condition for being subsequently treated in a converter to obtain the elimination of the volatile constituents. The fluid matte, containing all the zinc and lead that has not been volatilized in the furnace may be tapped into an ordinary copper converter and then treated to volatilize the whole of the zinc and lead. The volatile constituents issuing from the furnace and converter comprising zinc, lead, and sulfur are conducted to a wet condensing tower or chamber, or a number of such structures presenting a large condensing surface. As the volatile constituents pass through the said chamber they encounter a spray or current of water which absorbs the sulfurous acid gas therein to form sulfurous and eventually, owing to the constant exposure to the oxygen of the air, sulfuric acid. The acid thus produced serves to dissolve the zinc while the lead is precipitated as sulfite or sulfate as the case may be. The lead sulfite or sulfate suspended in the resulting liquor may be removed in any suitable manner for example by filters or centrifugal machines and if desired may be reduced to lead in the ordinary way.

The liquor after being freed from the lead, and if required, purified, may be electrolyzed so as to obtain the zinc therein in a pure metallic state while the supernatant liquor, wholly or partially freed from zinc, may be returned to the condensing tower or chamber to be further enriched in zinc and utilized to condense the volatile constituents. It will be seen therefore that the liquor in the condensing chamber or chambers is used over and over again so that the successive operations form a continuous cycle.

In order that the said invention may be clearly understood and readily carried into effect I will proceed to describe the same more fully with reference to the accompanying drawings, in which :—

Figure 7:
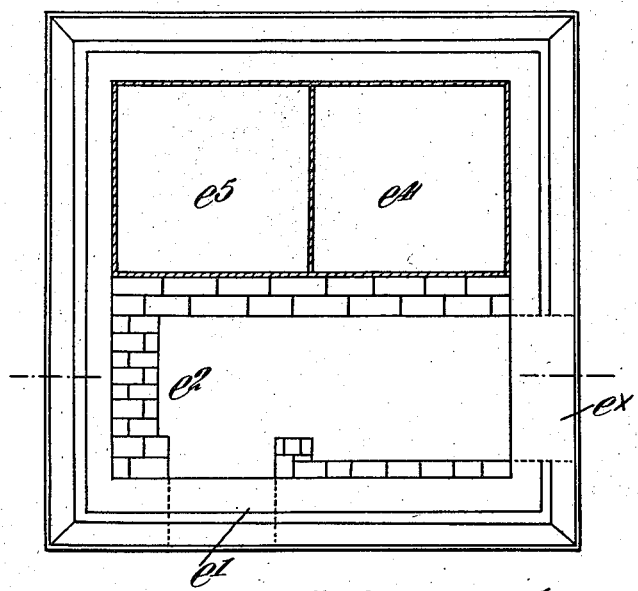
Figure 8:
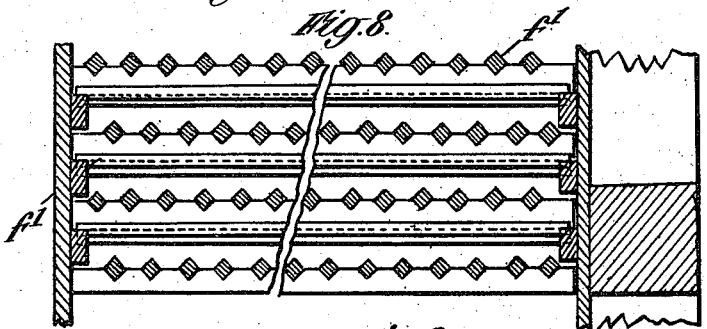
Figure 9:
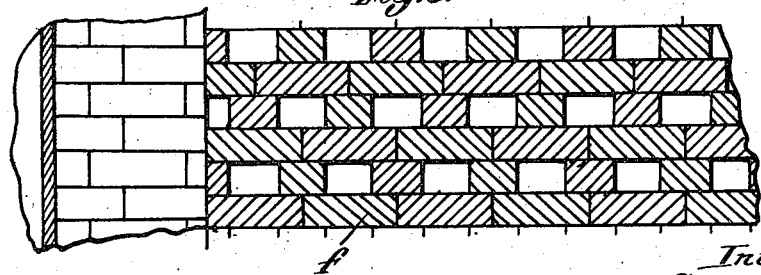

Figure 1 is a sectional plan of a condensing chamber for use with the present invention. Figs. 2 and 3 are sectional elevations of said chamber taken respectively on the lines 2—2 and 3—3 of Fig. 1. Fig. 4 is a sectional end elevation taken on the line 4—4 of Fig. 1. Fig. 5 is a sectional elevation of a condensing tower which is adapted to be used alone or in conjunction with the condensing chamber in carrying out the present invention. Fig. 6 is a sectional plan taken on the line 6—6 of Fig. 5 and Fig. 7 a similar view taken on the line 3—3 of the same figure. Figs. 8 and 9 are detail views respectively of the wooden baffles and brick checker-work in said tower. Fig. 10 is a detail view of a perforated anode used in the electrolytic vats. Fig. 11 is a diagrammatic side elevation of an installation for carrying out the present invention. Fig. 12 is a plan view thereof.

Referring to Figs. 1 to 4 of the drawings the condensing chamber $a$ is made of dimensions suited to the capacity of the plant and is provided with compartments $a'$, $a^2$, $a^3$, $a^4$, $a^5$, $a^6$, $a^7$ which the volatile constituents from the furnace and converter, not shown, are made to traverse. The chamber may however be built without compartments. The fumes or volatile constituents from the converter or furnace enter the chamber $a$ through the passage $b$ (Fig. 2) and any solid matter in suspension in said fumes will be deposited in the compartment $a'$ which is provided with an opening $b'$ Fig. 1, for the removal of the said solid matter. The fumes pass from the compartment $a'$ through the passage $b^2$ into the compartment $a^2$ which is filled with fire and acid proof brick checker-work $c$ constructed in such a manner that all the channels $c'$ in each layer of bricks are covered by the superposed layer of bricks so that the fumes are made to traverse a sinuous path and remain in constant contact with the surfaces of the covering bricks. The surfaces of the bricks of the checker-work are maintained in a wet condition by means of a stream of liquor which trickles through a roof or flooring $d$ of perforated tiles $d'$ arranged at the upper part of the chamber.

The roof or flooring $d$ extends over all the compartments of the chamber excepting the compartment $a'$ and the liquor therefrom falls into said compartments. The fumes which are cooled in traversing the checker-work in the compartment $a^2$ then pass through the opening $b^3$ in the partition $b^4$ into the compartment $a^3$ which contains wooden baffle rods $d^2$ arranged in superposed rows so that successive layers of rods are disposed at right angles to each other. Moreover the arrangement is such that the rods $d^2$ in alternate rows are staggered so that the rods in one row cover the openings in the other row. The rods in all the rows may if desired run in the same direction but in this case the staggered arrangement would be retained as it is essential to the efficient contact of the fumes with the wet surfaces of the wooden baffle rods $d^2$.

The fumes ascend through the compartment $a^3$ and pass through the opening $b^5$ in the partition $b^6$ into the compartment $a^4$. This compartment like all the succeeding ones is filled with wooden baffle rods $d^2$ in a similar manner to the compartment $a^3$ and the fumes descend through the compartment $a^4$ and opening $b^7$ in the partition $b^8$ into the compartment $a^5$ which they ascend, they then pass over the partition $b^9$ into the compartment $a^6$, through the opening $b$ in the partition $b^{10}$ into the compartment $a^7$ which they leave through the opening $b^{11}$. In order to induce the flow of the fumes through the compartments of the condensing chamber the opening $b^{11}$ may be connected to a fan which is adapted to draw the fumes through the chamber and pass the same to a chimney or stack.

The partitions between the various compartments in the condensing chamber are all provided with openings such, as $b^3$, $b^7$, $b^{12}$ at their lower extremities so that the liquor in the compartments may leave the chamber over a water seal $d^4$ disposed at the end thereof. The water seal $d^4$ is sufficiently high to prevent the fumes escaping in an irregular manner from one compartment to another. The liquor flowing over the water seal $d^4$ is raised by a suitable pump to the top of the chamber so that it may again descend through the same in the manner described to absorb the zinc and other constituents of the fumes from the furnace or converter.

The fumes or volatile constituents from the furnace and converter may if desired be carried to a condensing tower $e$ as shown in Figs. 5 to 9 into which they enter respectively through the openings $e'$, $e^x$. As in the case of the condensing chamber the tower may be divided into a number of compartments $e^2$, $e^3$, $e^4$, $e^5$, by means of suitable partitions which are provided with openings to allow of the fumes or volatile constituents traversing a predetermined path through the compartments of the tower. The compartment $e^2$ is filled with brick checker-work $f$ of the character previously described while the remaining compartments are filled with wooden baffle rods $f'$ arranged in a similar manner to the corresponding members in the aforementioned condensing chamber. A floor or roof $f^0$ of closely perforated tiles is arranged at the top of the tower so as to supply the liquor to the various compartments thereof. The liquor flows through the perforations in the tiles and down over the brick checker-work and wooden baffles in the respective chambers.

The fumes from the converter enter the tower, as previously stated, through the opening $e^x$ and are prevented from rising into the compartment $e^3$ by the fireproof cover or roof $f^2$. After they have passed some distance into the tower they mingle with the fumes from the furnace which enter the tower through the opening $e'$. They then pass up through the brick checker-work $f$ in the compartment $e^2$, through opening $f^3$ in the partition $f^4$, down through the wooden baffles $f'$ in compartment $e^3$, through opening $f^5$ in the partition $f^6$, up through the wooden baffles in the compartment $e^4$ through the rear opening $f^8$ in the partition $f^4$ down through the baffles in compartment $e^5$ and out of the tower through a conduit $f^7$ to an exhausting fan connected to the said conduit. The liquor which descends through the various compartments of the condensing tower accumulates at the foot of the tower and flows over a water seal $f^8$. It is then raised by means of pipes $f^9$ disposed above the perforated tiles $f^0$ which are adapted to uniformly distribute the liquor over the upper surface of the said tiles.

When local conditions render it convenient the condensing tower and chamber may be used together and in this way the period of time during which the fumes are in contact with the liquor is doubled. With this arrangement the electric furnace and the condensing tower are preferably disposed above the top of the condensing chamber so that the liquor from the tower may gravitate on to the tiles of the condensing chamber for distribution to the various compartments thereof. The opening $f^5$ in the partition $f^6$ of the tower between the compartments $e^3$ and $e^4$ is omitted when the tower and condensing chamber are used together and the converter is arranged on the level of the condensing chamber. According to this method of working the fumes from the furnace enter the tower through the opening $e'$, pass through the checker work $f$ in the compartment $e^2$, through the wooden baffles $f'$ in the compartment $e^3$ and leave through the opening $e^0$ at the bottom of said compartment $e^3$. They are conducted from the opening $e^0$ through a suitable conduit to the opening $a^9$ formed at the top of the compartment $a'$ of the condensing chamber where they mingle with the fumes from the converter which enter said chamber $a'$ through the opening $b$. The combined fumes then pass through the several compartments of the condensing chamber, as previously described, and pass by way of the opening $b''$ at the top of the last compartment $a^7$ and a suitable conduit to the compartment $e^4$ of the tower through which compartment and the next compartment $e^5$ they pass to the exhausting fan or chimney connected to the conduit $f^7$. The liquor which has passed through the tower gravitates through the condensing chamber and is then raised to the top of the tower for further circulation.

Referring to Figs. 11 and 12 and assuming a complex sulfid ore containing lead, zinc, copper, silver, gold and iron is to be treated, the operation would be as follows: The ore is charged by means of a car $m$ and hopper $m^1$ into the electric furnace $m^2$ and is rendered fluid by the heat generated between the electrodes $m^3$ therein, and at the same time a portion of the lead, zinc, silver and sulfur is volatilized. The remainder of these substances and the other constituents of the ore separate in the hearth of the furnace into a matte pr lead, zinc, copper, iron th silver all the gold and of the sulfur contents of quired for the formation into the slag containing, i gible quantities of the ec The matte is then tappec ladle $n$ and transferred from the furnace $m^2$ to where by means of an air sure the volatile constitu zinc, lead and sulfur are metalliferous fumes from gether with those issuing are then conducted thro and $n^3$ to the condensing liquor absorbs the sulfur the furnace fumes to form furous acid ($H_2SO_3$) wl zinc constituents of the f sulfid ($ZnSO_3$), and even of the constant exposure the air and the presence o formed in the same way sulfate ($ZnSO_4$) is formec is in the form of a mixture sulfate not soluble in the a and remains in suspensic fate liquor. The liquor the liquid seal O into a s culated through the conc it has absorbed the desir by means of the pump $O^3$ may be provided so bodies of liquor may be u required. After the liq ciently enriched in zinc it the filter press $O^4$ to be pended lead product, th duced to lead bullion in The clear zinc solution, a purities, if any are prese storage tank $p$ from wh to the electrolytic vats $p$ deposited in a pure metal flow from the vats pas and is returned to the further treatment. Afte deprived of the whole of the zinc held in solut the sump $O^1$ and is pum condensing plant so tha sorb zinc from the fum tion for treatment in the Instead of separatin after the liquor has a amount of zinc, it may the liquor by a suitable ately after leaving the chamber. In this case allowed to flow throu electrolytic refinery fo before being returned tower or condensing cl is thus treated each time it completes its circuit through the condensing plant.

The electrolytic plant is preferably provided with perforated anodes $s$, Fig. 10 so as to insure the uniform circulation of the electrolyte through the depositing vats and permit a large increase in the current density over that used in ordinary practice. Moreover this arrangement enables a uniform deposit of the zinc on the cathodes. Each anode is formed of a plate of suitable dimensions provided with a staggered arrangement of holes or perforations $s^1$ which are disposed on the central portions of the surfaces of the plate and pass right through the same. If the residual matter in the converter contains sufficient copper it may be blown to blister copper in the converter in the usual manner. When suitable copper ores can be obtained economically it may be advisable to mix them in the proper proportion with the original charge of complex ore if the latter does not contain sufficient copper for the economical production of a suitable quantity and grade of residual matte. If the residual matte which is freed from zinc and lead does not contain sufficient copper to warrant its further treatment for blister copper, it may be used as a flux in the furnace.

What I claim and desire to secure by Letters Patent of the United States is:—

1. A process for the treatment of ores consisting in fusing the ore charge by electrical means without reducing the same, blowing air through the liquid charge thereby volatilizing its volatile metallic constituents and subsequently recovering said volatile metallic constituents.

2. A process for the treatment of ores consisting in passing electric current through the ore charge until it is fused, transferring the liquid charge to a converter, blowing air under pressure through said liquid charge, thereby volatilizing the bulk of its volatile metallic constituents, condensing the volatile metallic constituents and subsequently recovering the same.

3. A process for the treatment of complex ores consisting in fusing the ore charge by subjecting same to the action of an electric current, transferring the liquid matte thus obtained to a converter, blowing air under pressure through said liquid matte, thereby volatilizing the bulk of its volatile metallic constitutents, condensing the volatile metallic constituents by aqueous means and subsequently recovering the same.

4. A process for the treatment of complex ores containing zinc consisting in fusing the ore charge by electrical means, transferring the liquid charge to a converter, blowing air under pressure through said liquid matte, thereby volatilizing the bulk of its volatile metallic constituents, dissolving the volatilized zinc constituent in a liquid and finally subjecting the solution thus obtained to electrolytic treatment.

5. A process for the treatment of complex ores containing volatile metals such as zinc, lead and silver in combination with sulfur, consisting in fusing the ore charge and partially volatilizing its metallic constituents by electrical means, blowing air under pressure through the liquid charge to volatilize the remaining part of its volatile metallic constituents, dissolving the volatile zinc constituent and precipitating the volatile lead constituent given off during the fusing and blowing operations by a liquid, removing the precipitated lead from said liquid and finally recovering the metallic zinc by electrolytic treatment.

6. A process for the treatment of complex ores containing volatile metals such as zinc, lead and silver in combination with sulfur, consisting in passing electric current through the ore charge thereby fusing same and incidentally volatilizing part of its volatile metallic constituents, transferring the liquid charge to a converter, blowing air under pressure through said liquid charge thereby volatilizing the bulk of its volatile constituents, uniformly distributing the metalliferous fumes given off during the fusing and blowing operations over a large condensing surface, dissolving the volatile zinc constituent and precipitating the lead constituent by a liquid streaming over said condensing surface, the precipitated lead constituent remaining in suspension in said liquid, removing the precipitated lead constituent from said liquid and finally recovering the metallic zinc from the solution by electrolysis.

In testimony whereof I affix my signature in presence of two witnesses.

OTTO CARL RUDOLPH.

Witnesses:
  T. SELBY WARDLE,
  WALTER J. SKERTEN.